US010120937B2

(12) United States Patent
Peng (10) Patent No.: US 10,120,937 B2
(45) Date of Patent: Nov. 6, 2018

(54) METHOD AND SYSTEM FOR MASKING AND FILTERING WEB CONTENTS AND COMPUTER PROGRAM PRODUCT

(71) Applicant: Wistron Corporation, New Taipei (TW)

(72) Inventor: Ares Peng, New Taipei (TW)

(73) Assignee: Wistron Corporation, New Taipei (TW)

( * ) Notice: Subject to any disclaimer, the term of this patent is extended or adjusted under 35 U.S.C. 154(b) by 541 days.

(21) Appl. No.: 14/588,984

(22) Filed: Jan. 5, 2015

(65) Prior Publication Data

US 2016/0070794 A1 Mar. 10, 2016

(30) Foreign Application Priority Data

Sep. 4, 2014 (CN) .......................... 2014 1 0448953

(51) Int. Cl.
*G06F 17/30* (2006.01)
*G06F 7/00* (2006.01)

(52) U.S. Cl.
CPC .............................. *G06F 17/30864* (2013.01)

(58) Field of Classification Search
CPC .............................................. G06F 17/30864
USPC ...................................................... 707/723
See application file for complete search history.

(56) References Cited

U.S. PATENT DOCUMENTS

| 8,185,532 B2 | 5/2012 | Tsai et al. |
| 8,495,058 B2 | 7/2013 | Kulick et al. |
| 2005/0078082 A1* | 4/2005 | Muralidharan ..... G06F 19/3406 345/156 |
| 2007/0168331 A1 | 7/2007 | Reddy et al. |
| 2008/0021889 A1* | 1/2008 | Nam .................. G06F 17/30864 |
| 2010/0082626 A1 | 4/2010 | Tsai et al. |

(Continued)

FOREIGN PATENT DOCUMENTS

| CN | 101115068 | 1/2008 |
| CN | 101866347 | 10/2010 |

(Continued)

OTHER PUBLICATIONS

"Office Action of Taiwan Counterpart Application" with partial English translation, dated Feb. 25, 2016, p. 1-p. 10, in which the listed references were cited.

(Continued)

*Primary Examiner* — Kuen S Lu
(74) *Attorney, Agent, or Firm* — JCIPRNET (57) ABSTRACT

A method and a system for filtering a plurality of search results in a web page and a computer program product therefor are provided. The method includes, receiving search results corresponding to a search request, and classify the plurality of search results to a plurality of group according to contents of the plurality of search results, wherein the plurality of search results having the same content are classified to the same group. The method also includes generating and storing an identification value corresponding to each of the groups. The method further includes displaying the plurality of search results and marking search results belonging to the same group according to the identification value, and executing a shield operation on at least one search results among the plurality of search results.

18 Claims, 11 Drawing Sheets

(56) References Cited

U.S. PATENT DOCUMENTS

| | | | | |
|---|---|---|---|---|
| 2010/0119157 A1* | 5/2010 | Kameyama | .......... | H04N 19/115 |
| | | | | 382/195 |
| 2012/0209853 A1* | 8/2012 | Desai | ................ | G06F 17/30675 |
| | | | | 707/741 |
| 2013/0060755 A1 | 3/2013 | He et al. | | |
| 2013/0091130 A1* | 4/2013 | Barrow | ............. | G06F 17/30699 |
| | | | | 707/723 |
| 2014/0013065 A1* | 1/2014 | Arakawa | ............... | G06F 3/0604 |
| | | | | 711/154 |

FOREIGN PATENT DOCUMENTS

| | | |
|---|---|---|
| CN | 101963966 | 2/2011 |
| CN | 102184230 | 9/2011 |
| CN | 103890710 | 6/2014 |
| TW | 201013433 | 4/2010 |
| TW | 201312490 | 3/2013 |

OTHER PUBLICATIONS

"Office Action of Taiwan Counterpart Application" with partial English translation, dated May 9, 2016, p. 1-p. 5, in which the listed references were cited.
"Office Action of China Counterpart Application", dated May 4, 2018, p. 1-p. 7, in which the listed references were cited.
"Office Action of Taiwan Counterpart Application," dated Nov. 17, 2017, p. 1-p. 4, in which the listed references were cited.

* cited by examiner

METHOD AND SYSTEM FOR MASKING AND FILTERING WEB CONTENTS AND COMPUTER PROGRAM PRODUCT

CROSS-REFERENCE TO RELATED APPLICATION

This application claims the priority benefit of China application Ser. No. 201410448953.4, filed on Sep. 4, 2014. The entirety of the above-mentioned patent application is hereby incorporated by reference herein and made a part of this specification.

BACKGROUND

Field of the Invention

The invention is directed to a method and a system for masking and filtering web contents and more particularly, to a method and a system for masking and filtering a plurality of searching results in a web page and a computer program product thereof.

Description of Related Art

With the growingly development of the Internet, more and more information is presented on the Internet in a form of web pages for users to search. Likewise, searching data by means of search engines on the Internet is also a commonly used way for data searching. In most cases, when a keyword of data to be searched is input to a search website, the searched results are displayed on a web page of the search website. However, most of the searching results presented on the web page contain a great amount of AD information or information with duplicate contents. In other words, in case the results presented on the web page have many contents that are the same, the searching results with different contents might be displayed on the following pages or other pages. As a result, the users can't browse quickly to obtain the target data.

Accordingly, how to resolve issues of browsing the great amount of data that cause the users to be unable to quickly obtain the desired data and how to improve accuracy of the searching results presented in the web page are goals that the artisans of the art have to make effort to achieve.

SUMMARY

The invention provides a method and a system for masking and filtering web contents and a computer program product thereof capable of effectively filtering a plurality of searching results of a web page.

An exemplary example of the present invention provides a method for masking and filtering web contents for filtering a plurality of search results in a web page. The method includes: receiving a plurality of searching results corresponding to a search request; and classifying the plurality of search results to a plurality of group according to contents of the plurality of search results. The method also includes: generating and storing an identification value corresponding to each of the groups. The method further includes: displaying the plurality of search results and marking the search results belonging to the same group according to the identification value; and executing a shield operation on at least one searching result among the plurality of search results.

In an exemplary embodiment of the invention, the searching results having the same content are classified to the same group.

In an exemplary embodiment of the invention, the step of executing the shield operation on the at least one searching result among the plurality of search results includes: receiving a confirming masked region message of executing the shield operation on the searching results belonging to a first group among the groups; and generating a mask for the searching results belonging to the first group and displaying only one of the searching results belonging to the first group.

In an exemplary embodiment of the invention, the step of executing the shield operation on the at least one searching result among the plurality of search results includes: receiving a selected region; and generating a mask for at least one first searching result among the searching results covered by the selected region according to the selected region, so as not to display the at least one first searching result.

In an exemplary embodiment of the invention, the step of executing the shield operation on the at least one searching result among the plurality of search results includes: receiving a filtering ratio; identifying a plurality of second searching results among the searching results according to the filtering ratio, wherein a similarity value of the plurality of second searching results is greater than the filtering ratio; and generating a mask for the plurality of second searching results and displaying only one of the second searching results.

In an exemplary embodiment of the invention, the method further includes: storing at least one display result corresponding to the confirming masked region message, the selected region or the filtering ratio; and recording the at least one display result as at least one filtering record.

In an exemplary embodiment of the invention, the step of executing the shield operation on the at least one searching result among the plurality of search results includes: receiving a filtering record selection message corresponding to the at least one filtering record; and displaying the plurality of the searching results according to the at least one filtering record corresponding to the filtering record selection message.

An exemplary example of the present invention provides a system for masking and filtering web contents, wherein the system includes a web server and a user terminal. The user terminal receives a plurality of searching results corresponding to a search request from the web server. The user terminal has a plug-in module is displayed in a form of a graphical interface and executed on a web browser. The plug-in module classifies the searching results to a plurality of groups according contents of the plurality of searching results. Meanwhile, the plug-in module generates and stores an identification value corresponding to each of the groups. Additionally, the web browser displays the plurality of search results and marks the search results belonging to the same group according to the identification value. Further, the plug-in module executes a shield operation on at least one searching result among the plurality of search results.

In an exemplary embodiment of the invention, the searching results having the same content are classified to the same group.

In an exemplary embodiment of the invention, the plug-in module includes a masking region module. The masking region module receives a confirming masked region message of executing the shield operation on the searching results belonging to a first group among the groups and generates a mask for the searching results belonging to the first group, such that the web browser displays only one of the searching results belonging to the first group.

In an exemplary embodiment of the invention, the plug-in module further includes a selecting region module. The selecting region module receives a selected region, and generates a mask for at least one first searching result among the searching results covered by the selected region according to the selected region, such that the web browser does not display the at least one first searching result.

In an exemplary embodiment of the invention, the plug-in module further includes a filtering ratio module. The filtering ratio module receives a filtering ratio and identifies a plurality of second searching results among the searching results. A similarity value of the plurality of second searching results is greater than the filtering ratio. The filtering ratio module further generates a mask for the plurality of second searching results, such that the web browser displays only one of the second searching results.

In an exemplary embodiment of the invention, the plug-in module further includes a database module and a filtering recording module. The database module stores at least one display result corresponding to the confirming masked region message, the selected region or the filtering ratio. The filtering recording module records the at least one display result as at least one filtering record.

In an exemplary embodiment of the invention, the filtering recording module further receives a filtering record selection message corresponding to the at least one filtering record and induces the web browser to display the searching results according to the at least one filtering record corresponding to the filtering record selection message.

An exemplary example of the present invention provides a computer program product including at least one program instruction, wherein the program instructions are loaded to a computer system to perform steps including: receiving a plurality of searching results corresponding to a search request; classifying the plurality of search results to a plurality of group according to contents of the plurality of search results; generating and storing an identification value corresponding to each of the groups; displaying the plurality of search results and marking the search results belonging to the same group according to the identification value; and executing a shield operation on at least one searching result among the plurality of search results.

In an exemplary embodiment of the invention, the searching results having the same content are classified to the same group.

In an exemplary embodiment of the invention, the step of executing the shield operation on the at least one searching result among the plurality of search results includes: receiving a confirming masked region message of executing the shield operation on the searching results belonging to a first group among the groups; and generating a mask for the searching results belonging to the first group and displaying only one of the searching results belonging to the first group.

In an exemplary embodiment of the invention, the step of executing the shield operation on the at least one searching result among the plurality of search results includes: receiving a selected region; and generating a mask for at least one first searching result among the searching results covered by the selected region according to the selected region, so as not to display the at least one first searching result.

In an exemplary embodiment of the invention, the step of executing the shield operation on the at least one searching result among the plurality of search results includes: receiving a filtering ratio; identifying a plurality of second searching results among the searching results, wherein a similarity value of the plurality of second searching results is greater than the filtering ratio; and generating a mask for the plurality of second searching results and displaying only one of the second searching results.

In an exemplary embodiment of the invention, the program instructions are further configured to be loaded to the computer system to perform steps comprising: storing at least one display result corresponding to the confirming masked region message, the selected region or the filtering ratio; and recording the at least one display result as at least one filtering record.

In an exemplary embodiment of the invention, the step of executing the shield operation on the at least one searching result among the plurality of search results includes: receiving a filtering record selection message corresponding to the at least one filtering record; and displaying the plurality of the searching results according to the at least one filtering record corresponding to the filtering record selection message.

To sum up, in the method and the system for masking and filtering web contents and the computer program product thereof, the searching results having duplicate contents can be automatically filtered out of the web page, and the searching results are displayed on the web page according to users' needs, so as to effectively improve accuracy of the searching results presented in the web page.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In order to enhance accuracy of searching results presented in a web page, the invention utilizes a method of filtering a plurality of searching results on the web page by means of masking and filtering elements of the web page, such that a user can quickly search data that he/she needs. In this way, operation experience of the user can be effectively improved.

Figure 1:
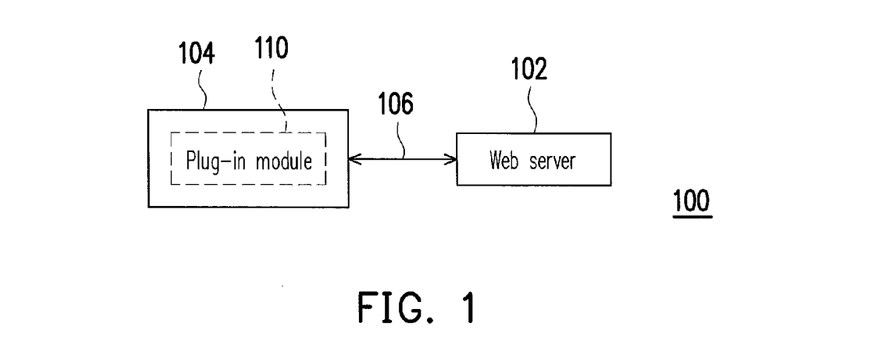
FIG. 1 is a schematic diagram illustrating a system for masking and filtering web contents according to an exemplary embodiment of the invention.

FIG. 1 is a schematic diagram illustrating a system for masking and filtering web contents according to an exemplary embodiment of the invention.

With reference to FIG. 1, a system 100 for masking and filtering web contents includes a web server 102 and a user terminal 104. The user terminal 104 may send a search request to the web server 102 and receive a plurality of searching results corresponding to the search request from the web server 102.

Specifically, the web page and other information available in a web browser are composed of HyperText markup language (HTML) elements. When the user search data through the user terminal 104, the user sends a search request to the web server 102 through a HyperText transfer protocol (HTTP) 106 in a transmission control protocol (TCP) of a web browser, a web crawler or any other tool provided by the user terminal 104. Thereby, the web server 102 transmits a data packet in response to the search request to the user terminal 104. After the receiving the data packet, the web browser of the user terminal 104 analyzes the type of said data packet (e.g., by parsing an HTML code), so as to display a plurality of searching results corresponding to the data packet on the web browser.

For example, in the present exemplary embodiment, the user terminal 104 may be a personal digital assistant (PDA), a notebook computer, a tablet computer, a general type desktop computer, or any other electronic device capable of data transmission by using the HTTP 106 and the web server 102.

Figure 2:
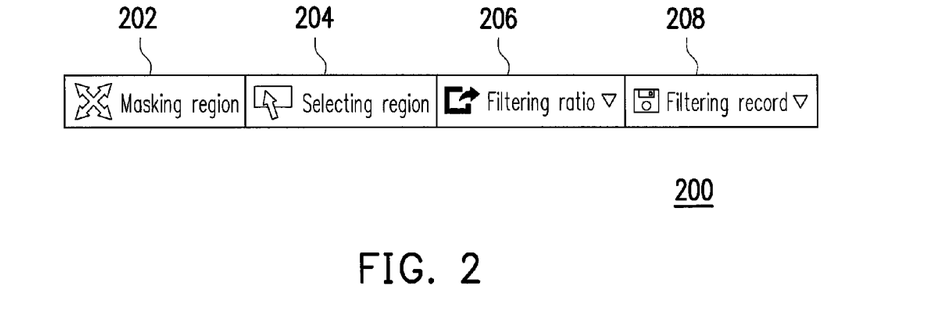
FIG. 2 is a schematic diagram illustrating the plug-in module displayed in a form of a graphical interface according to an exemplary embodiment of the invention.

FIG. 2 is a schematic diagram illustrating the plug-in module displayed in a form of a graphical interface according to an exemplary embodiment of the invention.

With reference to FIG. 1 and FIG. 2, in the present exemplary embodiment, the user terminal 104 further includes a plug-in module 110, and the plug-in module 110 is displayed in a form of a graphical interface 200 and executed on the web browser. When the user terminal 104 receives the searching results corresponding to the search request, the plug-in module 110 classifies the searching results to a plurality of groups according to contents of the searching results. For example, the searching results having the same content are classified to the same group. Particularly, the plug-in module 110 generates and stores an identification value corresponding to each of the groups. Thereby, when the web browser displays the searching results, the web browser marks the searching results belonging to the same group according to the identification value.

Additionally, in the present exemplary embodiment, the plug-in module 110 executes a shield operation on at least one searching result among the searching results. For example, the plug-in module 110 analyzes the searching results corresponding to the search request and reorganizes the searching results according to the user's operation and setting in the graphical interface 200 corresponding to the plug-in module 110 to return the searching results to the web browser for displaying.

To be more detailed, the graphical interface 200 corresponding to the plug-in module 110 provides a plurality of functional options to the user, such that the user may choose a desired function according to the demand. For instance, the functional options include a masking region function 202, a selecting region function 204, a filtering ratio function 206 and a filtering record function 208. The masking region function 202 provides the user with a function of executing a shield operation on the searching results marked as having the same content. The selecting region function 204 provides the user with a function of selecting the searching results to be mask by the user. The filtering ratio function 206 provides the user with a function of executing a shield operation on the searching results whose similarity value is greater than a certain filtering ratio. The filtering record function 208 provides the user with a function of looking up an operation log with respect to the previously operated shield operations. Additionally, it should be understood that the graphical interface 200 illustrated herein is merely an exemplary example of the graphical interface and not intended to limit the invention.

Figure 3:
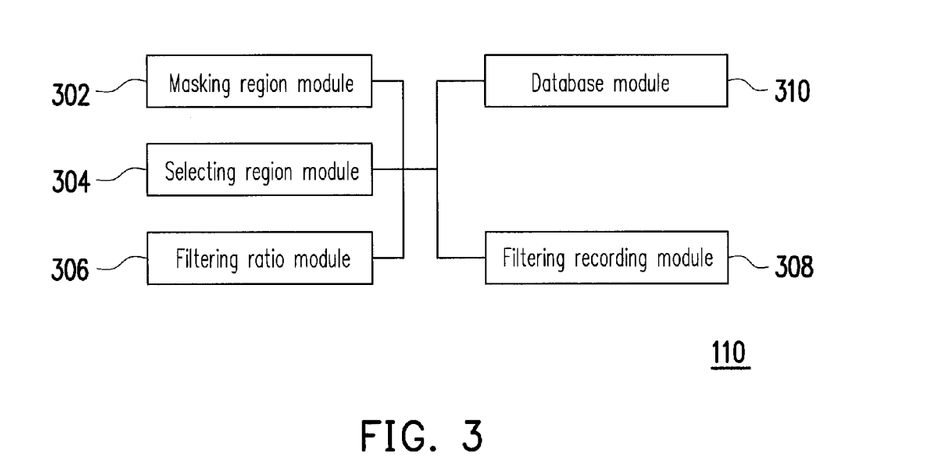
FIG. 3 is a block gram illustrating the plug-in module according to an exemplary embodiment of the invention.

FIG. 3 is a block gram illustrating the plug-in module according to an exemplary embodiment of the invention.

With reference to FIG. 2 and FIG. 3, the plug-in module 110 includes a masking region module 302, a selecting region module 304, a filtering ratio module 306, a filtering recording module 308 and a database module 310.

In the present exemplary embodiment, the masking region module 302 executes a shield operation corresponding to the option of the masking region function 202, and so on. Likewise, the selecting region module 304, the filtering ratio module 306, the filtering recording module 308 execute shield operations respectively corresponding to the options of the selecting region function 204, the filtering ratio function 206 and the filtering record function 208. Additionally, the database module 310 stores the searching results corresponding to each search request in the user terminal 104 and records display results of executing the shield operations corresponding to the selecting region module 304, the filtering ratio module 306, the filtering recording module 308.

Specifically, each of the shield operations described in the exemplary embodiments of the invention refers to generating a mask for certain searching results, such that the web browser does not display the searching results. The web page and the searching results in the web browser are displayed by means of composing HTML elements. Thus, in the present exemplary embodiment, when a mask is about to be generated for certain searching results, the plug-in module 110 only has to remove the HTML elements corresponding to the searching results to be masked according to HTML rules, such that the web browser may achieve the generation of the mask for the searching results according to HTML description. In another exemplary embodiment, it may also be a scenario that the HTML elements corresponding to the searching results to be masked are temporarily hidden according to the HTML rule, but the invention is not limited thereto. It should be noted that the plug-in module 110 of the invention masks and modifies the HTML elements corresponding to the searching results stored in the user terminal 104. In other words, the shield operations of the invention do not cause any affection or change to searching results browsed by the user on any other user terminal.

In order the clearly describe operations of the system 100 for masking and filtering web contents and the plug-in module 110, an example will be provided and described with reference to the plug-in module 110 depicted in FIG. 3.

Figure 4A:
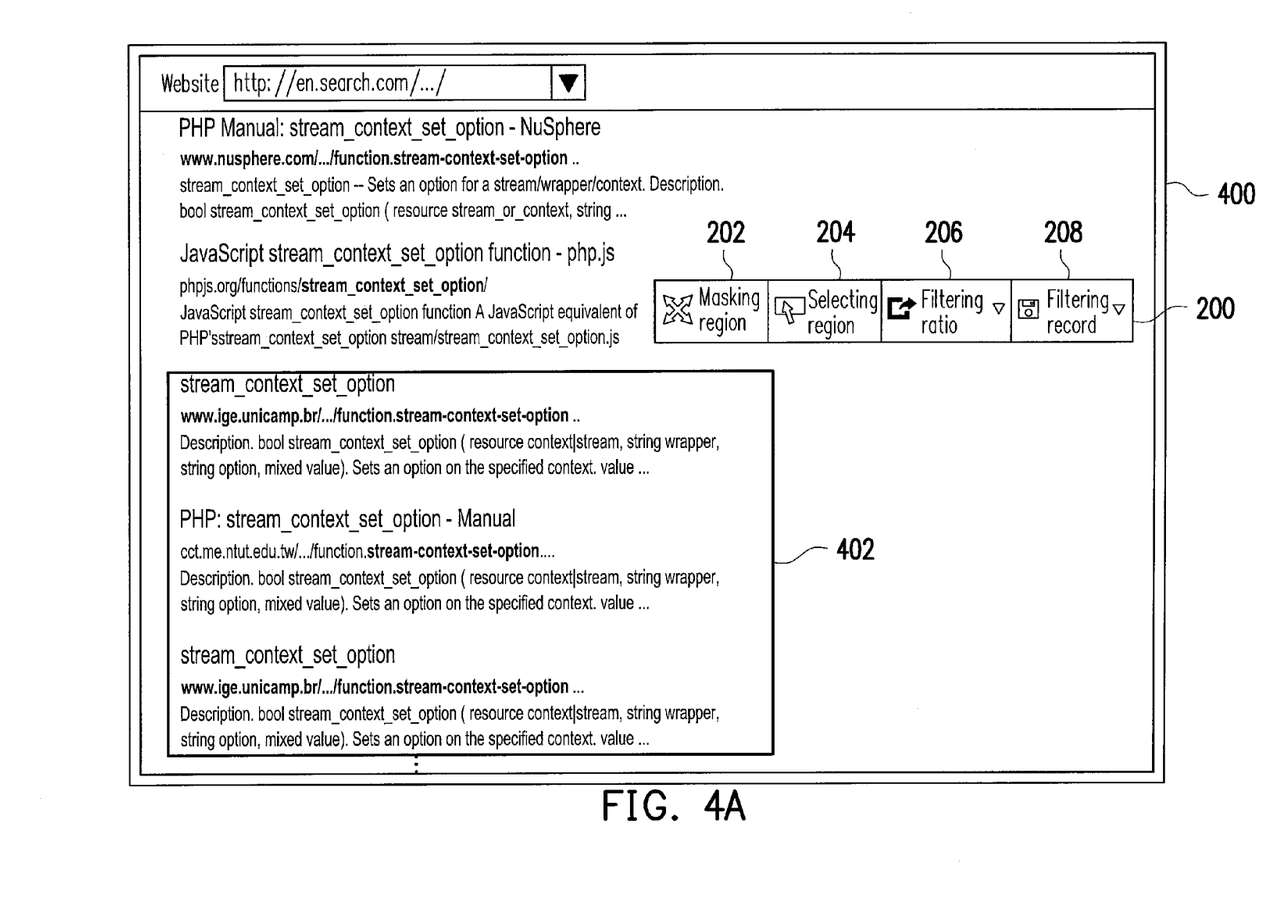
FIG. 4A and FIG. 4B illustrate an example of operating the plug-in module according to an exemplary embodiment of the invention.
Figure 4B:
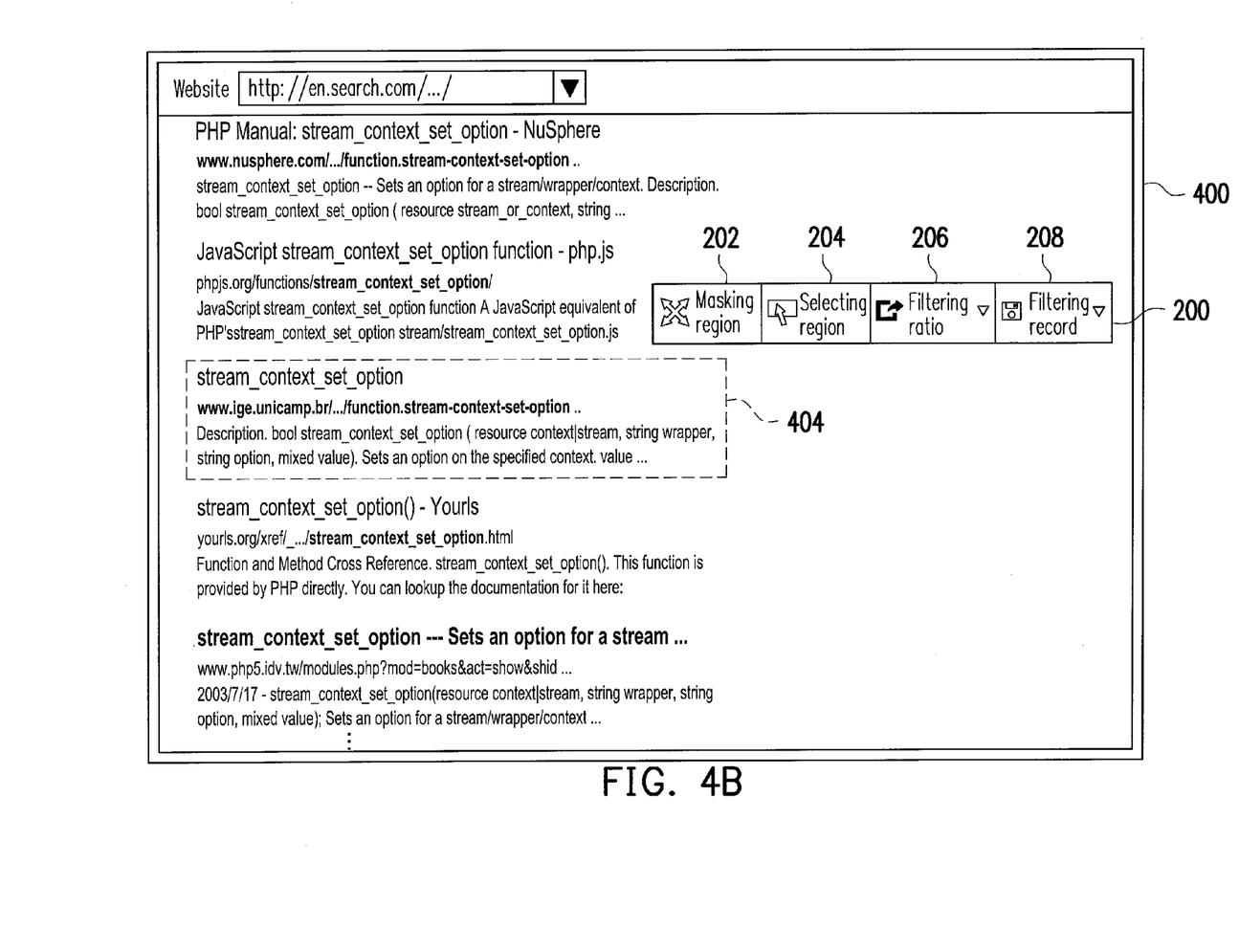

FIG. 4A and FIG. 4B illustrate an example of operating the plug-in module according to an exemplary embodiment of the invention.

In the present exemplary embodiment, the masking region module 302 receives a confirming masked region message of executing the shield operation of the searching results belonging to a first group among the groups and generates a mask for the searching results belonging to the first group, such that the web browser displays only one of the searching results belonging to the first group. In this case, an example, where a function of a hypertext preprocessor (PHP) program language serves as a keyword and "stream_context_set_option" is searched within a search engine, is illustrated to describe the operation of the plug-in module 110.

With reference to FIG. 4A, when the user terminal 104 receives a plurality of searching results corresponding to a search request, the plug-in module 110 classifies the searching results having the same content among the searching results to the same group. Thus, when a web browser 400 displays the searching results, the searching results having the same content are marked as a first group 402. However, in another exemplary embodiment, the web browser 400 may also mark the searching results for advertising among the searching results while displaying the searching results, but the invention is not limited thereto. For example, in an exemplary embodiment, the searching results for advertising may be marked as another group, or the plug-in module 110 directly generates a mask therefor.

With reference to FIG. 4B, in the scenario illustrated in FIG. 4A, if a mask is about to be generated for the searching results having the same content, so as not to display the searching results having the same content, the user may click on the masking region function 202 in the graphical interface 200 corresponding to the plug-in module 110, such that a shield operation is executed on the searching results having the same content. Namely, when the user clicks on the option of the masking region function 202, the masking region module 302 receives confirming masked region message of executing the shield operation on the searching results belonging to the first group 402 and generates the mask for the searching results belonging to the first group 402 according to the confirming masked region message. Thereby, the web browser 400 displays only one searching result 404 among the searching results belonging to the first group 402. It is to be mentioned that the user may filter a plurality of searching results having duplicate contents by means of the shield operation and merge such searching results as one searching result, such that redundant searching results are prevented from being present on the web page, which contributes to not only saving browsing time for the user, but also assisting the user in obtaining searching results with more accurate contents.

Figure 5A:
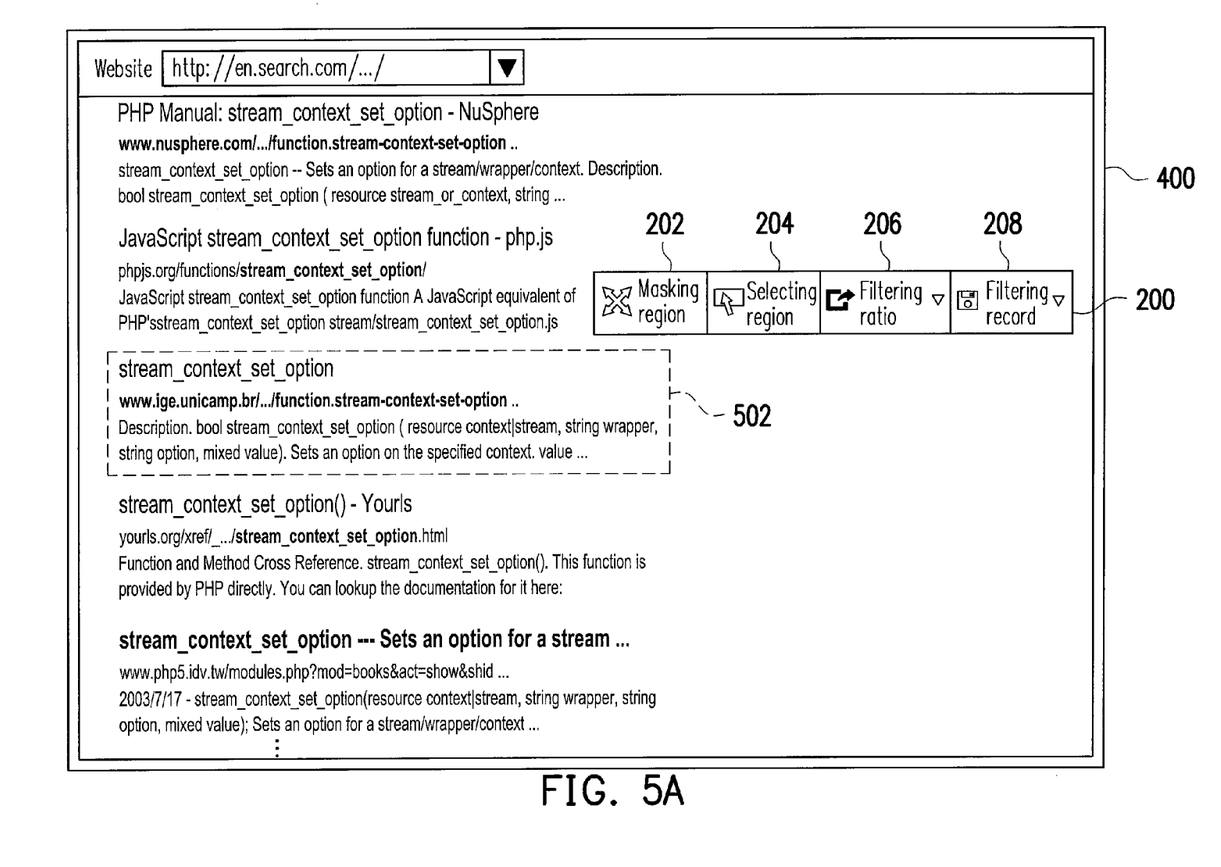
FIG. 5A and FIG. 5B illustrate an example of operating the plug-in module according to another exemplary embodiment of the invention.
Figure 5B:
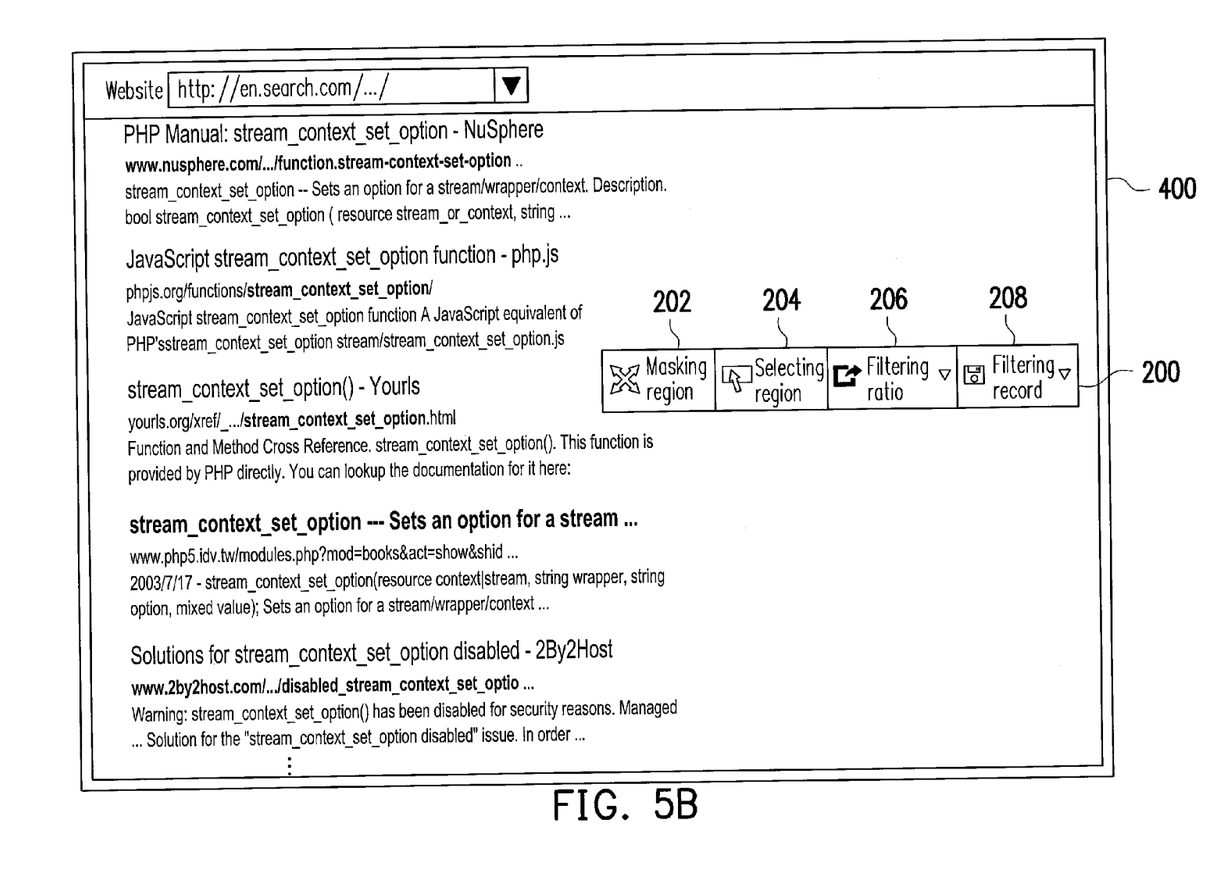

FIG. 5A and FIG. 5B illustrate an example of operating the plug-in module according to another exemplary embodiment of the invention.

In the present exemplary embodiment, the selecting region module 304 receives a selected region and generates a mask for at least one first searching result among the searching results covered by the selected region according to the selected region, such that the web browser does not display the at least one first searching result. For instance, when the user does not want to see certain searching results in the web browser or considers certain searching results therein as being reference valueless, the user may click on the selecting region function 204 in the graphical interface 200 corresponding to the plug-in module 110, so as to block a selected region for the searching results that the user wants to mask.

With reference to FIG. 5A and FIG. 5B, when clicking on the selecting region function 204 in the graphical interface 200 corresponding to the plug-in module 110, the user may select a selected region 502 for the searching results to be masked by pressing the mouse button and dragging the mouse cursor. At this time, it indicates that the user completes the selection if the user releases the mouse button. Thus, the selecting region module 304 receives the selected region 502 and generates a mask for at least one first searching result covered by the selected region 502 according to the selected region 502. Then, referring to FIG. 5B, the web browser 400 does not display the at least one first searching result covered by the selected region 502, but the invention is not limited thereto. For example, in another exemplary embodiment, the selected region selection by the user may cover a plurality of searching results. It is to be mentioned that the user may filter out the searching results that the user wants to mask by means of the shield operation, such as the searching results with less reference valueless or the searching results for advertising, and thereby, efficiency and quality of browsing the searching results may be effectively enhanced.

Figure 6A:
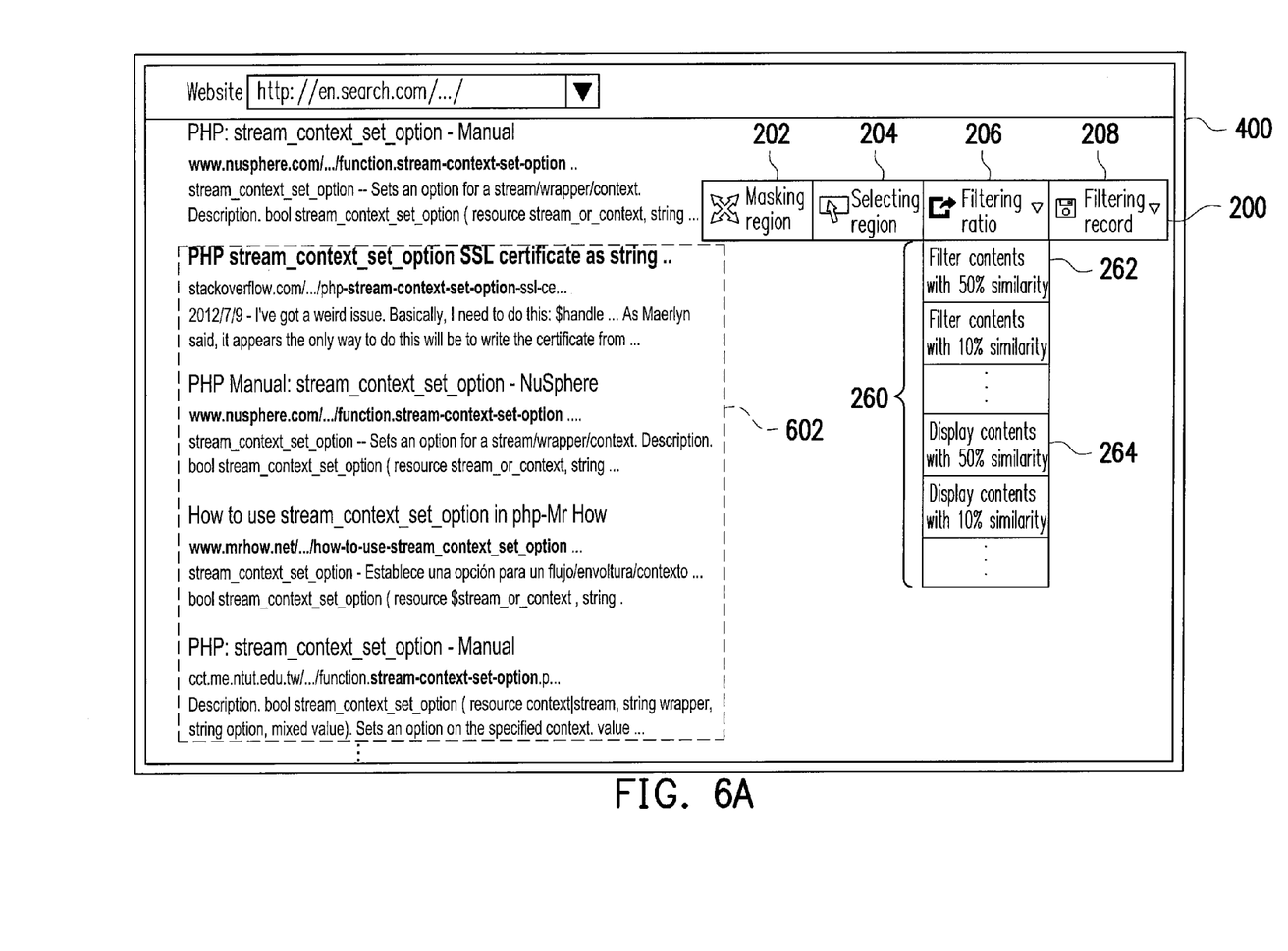
FIG. 6A through FIG. 6C illustrate an example of operating the plug-in module according to another exemplary embodiment of the invention.
Figure 6B:
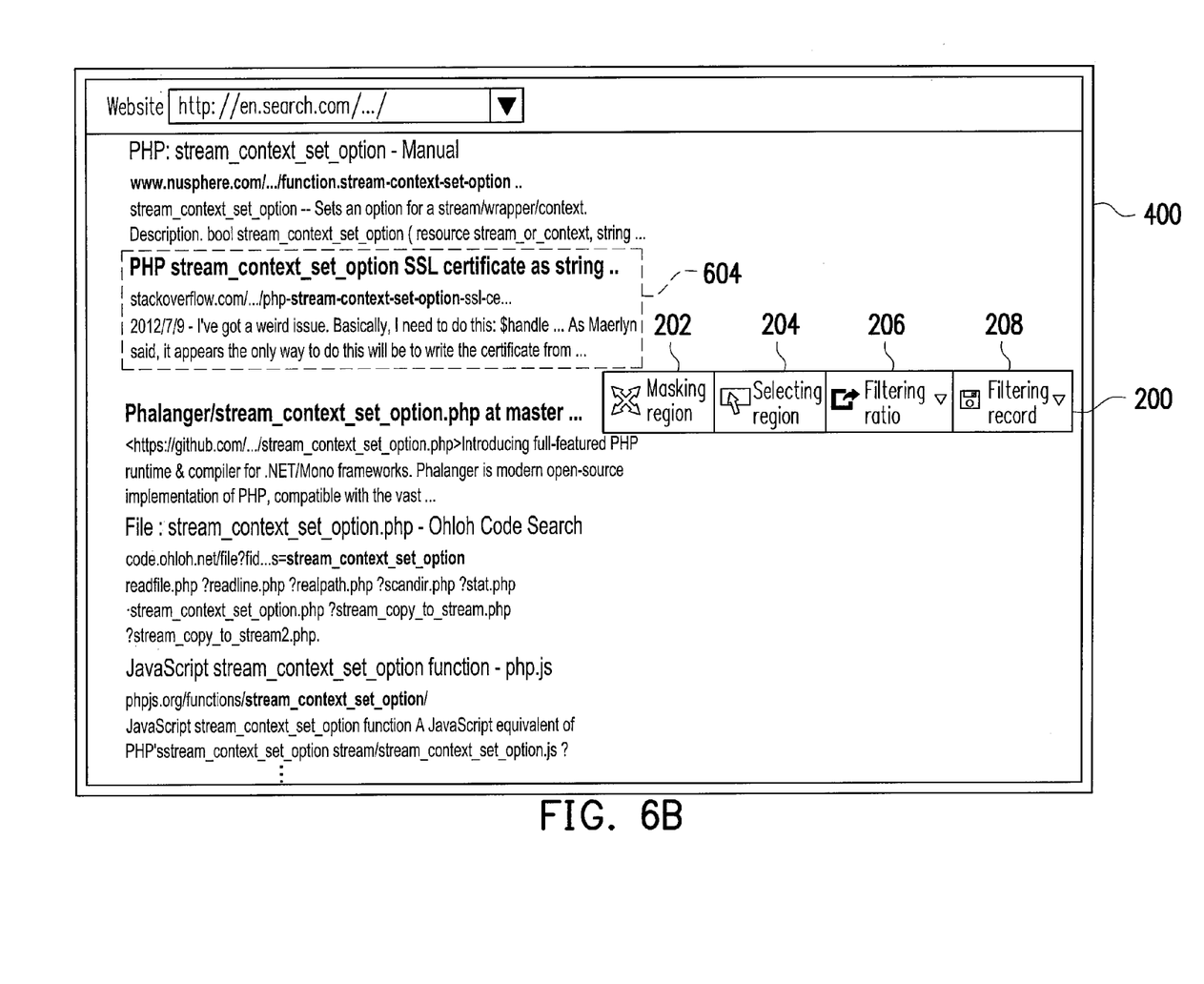
Figure 6C:
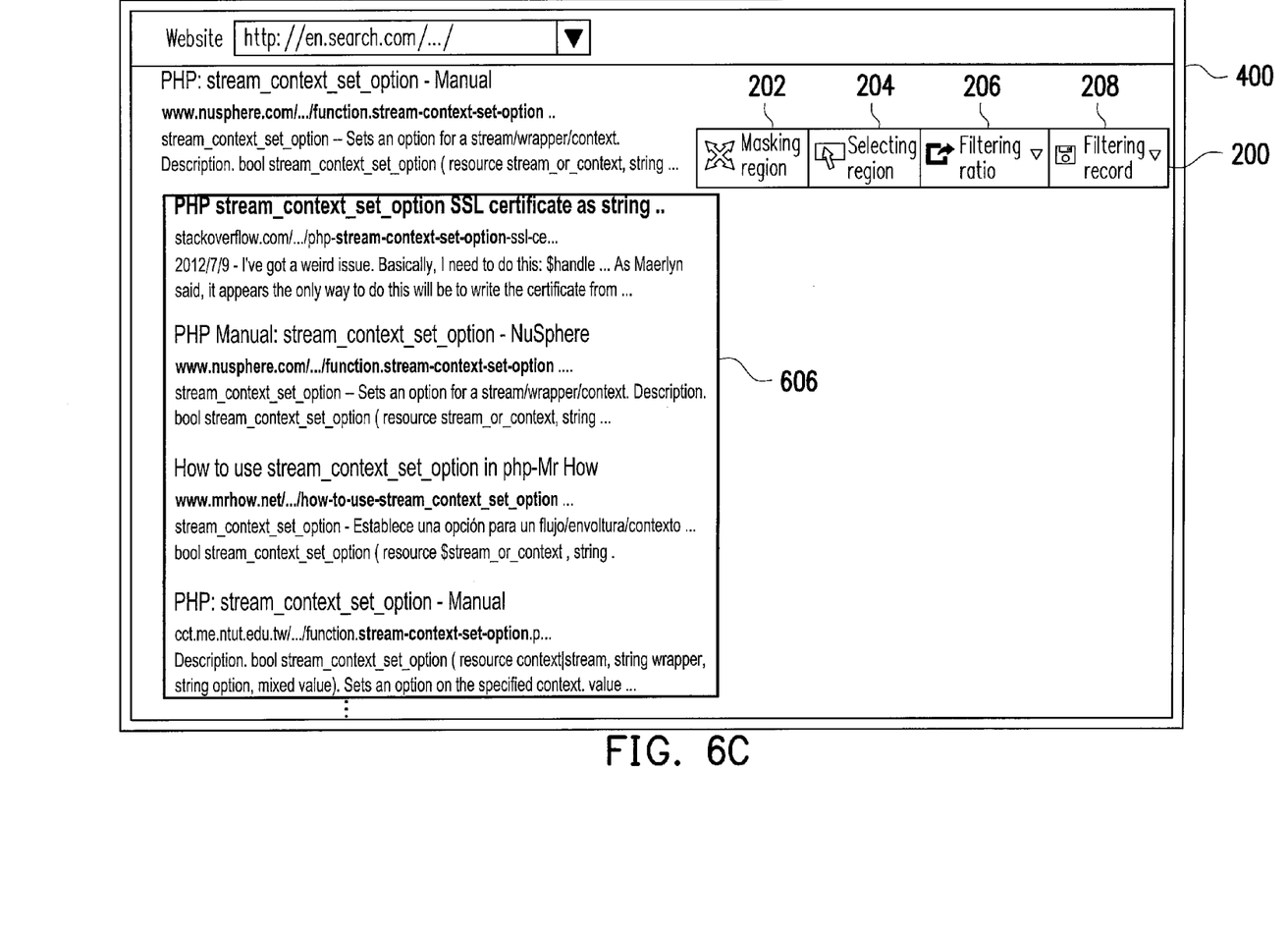

FIG. 6A through FIG. 6C illustrate an example of operating the plug-in module according to another exemplary embodiment of the invention.

In the present exemplary embodiment, the filtering ratio module 308 receives a filtering ratio and identifies a plurality of second searching results among the searching results according to the filtering ratio. A similarity value of the second searching results is greater than the filtering ratio received by the filtering ratio module 308. Additionally, the filtering ratio module 308 generates a mask for the second searching results, such that the web browser displays only one searching result among the second searching results.

With reference to FIG. 6A through FIG. 6C, to be more specific, when the user wants to execute a shield operation on certain searching results having a similarity value greater than a certain filtering ratio, the user may execute the shield operation through clicking the filtering ratio function 206 in the graphical interface 200 corresponding to the plug-in module 110. When the user clicks on the option of the filtering ratio function 206, the functional option generates a drop-down menu 260 to provide the user with options of various filtering ratios, such as options of filtering contents having similarity values of 10%, 20%, 30%, 40%, 50%, 60%, 70%, 80%, 90% and 100%, but the invention is not limited thereto. For example, the functional option also provides items for displaying the researching results with contents having similarity values of 10%, 20%, 30%, 40%, 50%, 60%, 70%, 80%, 90% and 100%.

In the present exemplary embodiment, when the user selects an item of "Filter contents with 50% similarity" 262 in the drop-down menu 260 of the filtering ratio function 206, the filtering ratio module 308 receives a filtering ratio (i.e., 50%) corresponding to the selected item and according to the filtering ratio, identifies the searching results among a plurality of searching results having a similarity value greater than the filtering ratio (i.e., 50%) as a plurality of second searching results 602. For instance, in the present exemplary embodiment, the filtering ratio module 308 determines the searching results among the plurality of searching results having the similarity value greater than the filtering ratio of 50% as a plurality of second searching results 602. Thus, the filtering ratio module 308 generates a mask for the second searching results 602, such that the web browser 400 displays only one searching result 604 among the second searching results 602 (as shown in FIG. 6B).

In another exemplary embodiment, when the user selects an item of "Display contents with 50% similarity" 264 in the drop-down menu 260 of the filtering ratio function 206, the filtering ratio module 308 receives a filtering ratio (i.e., 50%)

corresponding to the selected item and identifies the searching results among a plurality of searching results having a similarity value greater than 50% as the plurality of second searching results 602. In this case, the filtering ratio module 308 does not generate the mask for the second searching results 602 and marks the second searching results 602 as a region 606 to display those in the web browser 400 (as shown in FIG. 6C). In this way, the region with the similar content is presented to the user. Specially, the user may quickly filter the searching results by means of the shield operation according to his/her demand, so as to obtain the target data more accurately.

Figure 7A:
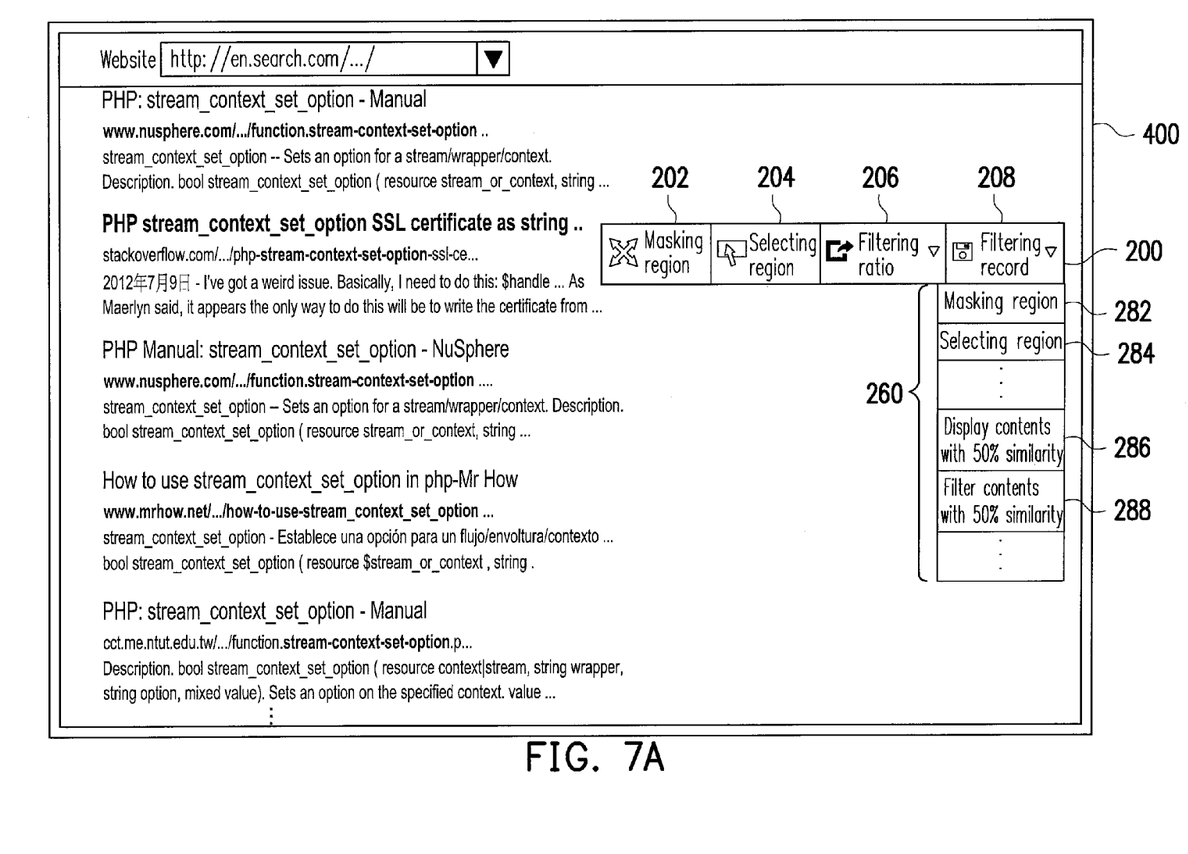
FIG. 7A and FIG. 7B illustrate an example of operating the plug-in module according to another exemplary embodiment of the invention.
Figure 7B:
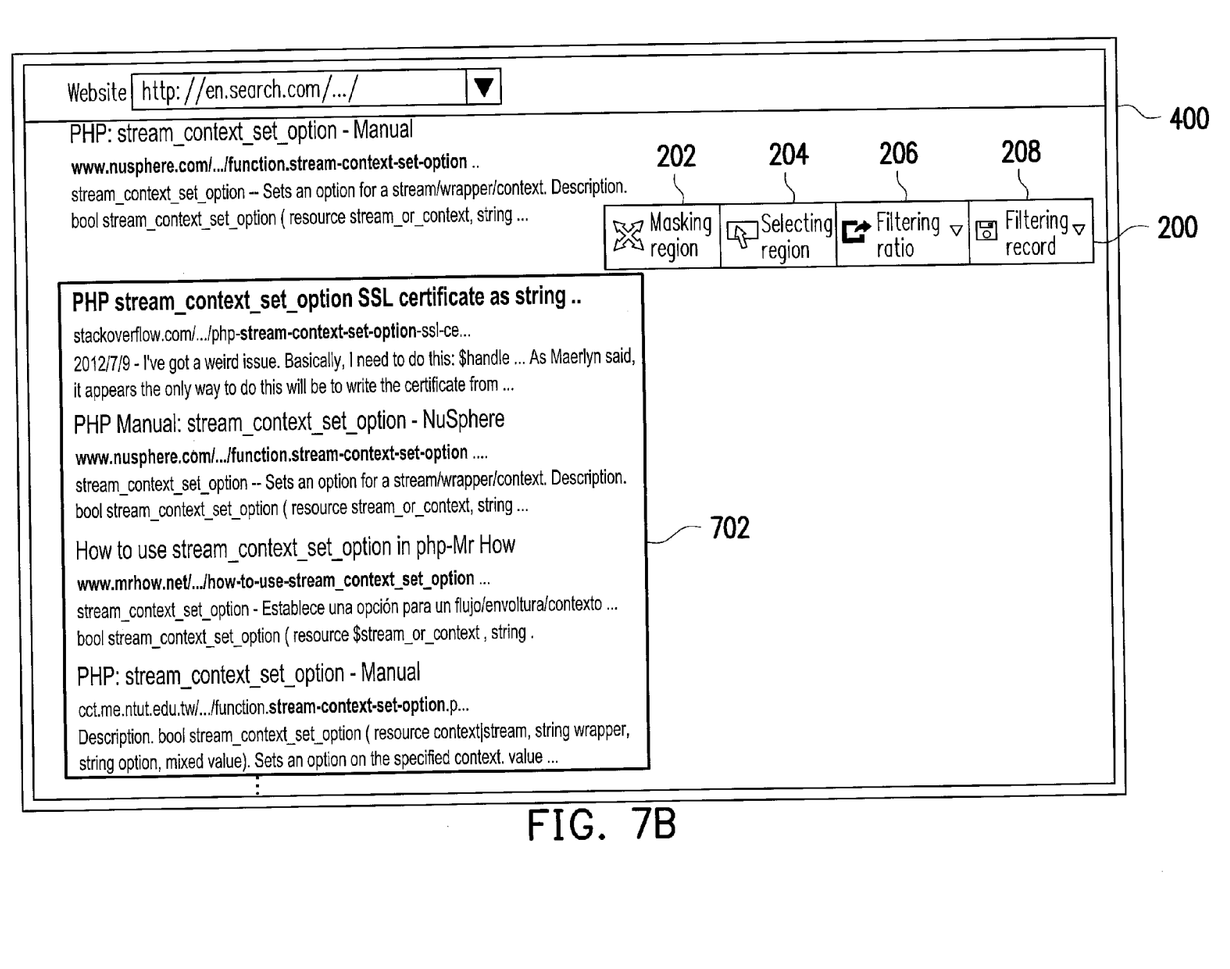

FIG. 7A and FIG. 7B illustrate an example of operating the plug-in module according to another exemplary embodiment of the invention.

It should be noted that in the present exemplary embodiment, the display results corresponding to the operations executed by the masking region module 302, the selecting region module 304 and the filtering ratio module 306 of the plug-in module 110 are all stored in the database module 310. In other words, the database module 310 stores the display results corresponding to the confirming masked region message, the selected region or the filtering ratio, and the filtering recording module 308 records the display results stored by the database module 310 as a plurality of filtering records.

With reference to FIG. 7A and FIG. 7B, in case the user wants to look up the Masking region and the searching results corresponding to the previously executed shield operations, the user may click on the filtering record function 208 in the graphical interface 200 corresponding to the plug-in module 110. Specifically, when the user clicks on the option of the filtering record function 208, the functional option generates a drop-down menu 280 to display a log of various records with respect to the operations executed by the user, and the user may click on any one of the options corresponding to the operation records to quickly return to or redo a certain operation record in the log.

In the present exemplary embodiment, when the user clicks on the option of the filtering record function 20, the drop-down menu 280 displays a plurality of filtering records corresponding to the operation records of the user. For example, the filtering records "Masking region" 282, "Selecting region" 284, "Display contents with 50% similarity" 286 and "Filter contents with 50% similarity" 288. In other words, the searching results displayed in the web browser 400 as shown in FIG. 7A are searching results after a shield operation of filtering contents with 90% similarity is executed. At this time, if the user clicks on the item of "Display contents with 50% similarity" 286 in the drop-down menu 280, the filtering recording module 308 receives a filtering record selection message corresponding to the filtering record and according to the filtering record (i.e., "Display contents with 50% similarity" 286) corresponding to the filtering record selection message, marks a region 702 containing the searching results with the similarity value greater than 50% to display those in the web browser 400 (as shown in FIG. 7B). In other words, the screen displayed by the web browser 400 returns to the screen where the region 702 containing the searching results with the similarity value greater than 50% since the searching results with the similarity value greater than 90% are filtered out.

It should be noted that the log of various records with respect to the executed operations displayed in the drop-down menu 280 of the filtering record function 208 are not limited to be displayed in the form shown in FIG. 7A. For example, in another exemplary embodiment, the filtering records corresponding to "Masking region" 282 and "Selecting region" 284 may be displayed in forms of website addresses or searching result names, such that the user may quickly know about the contents that are previously filtered out.

Figure 8:
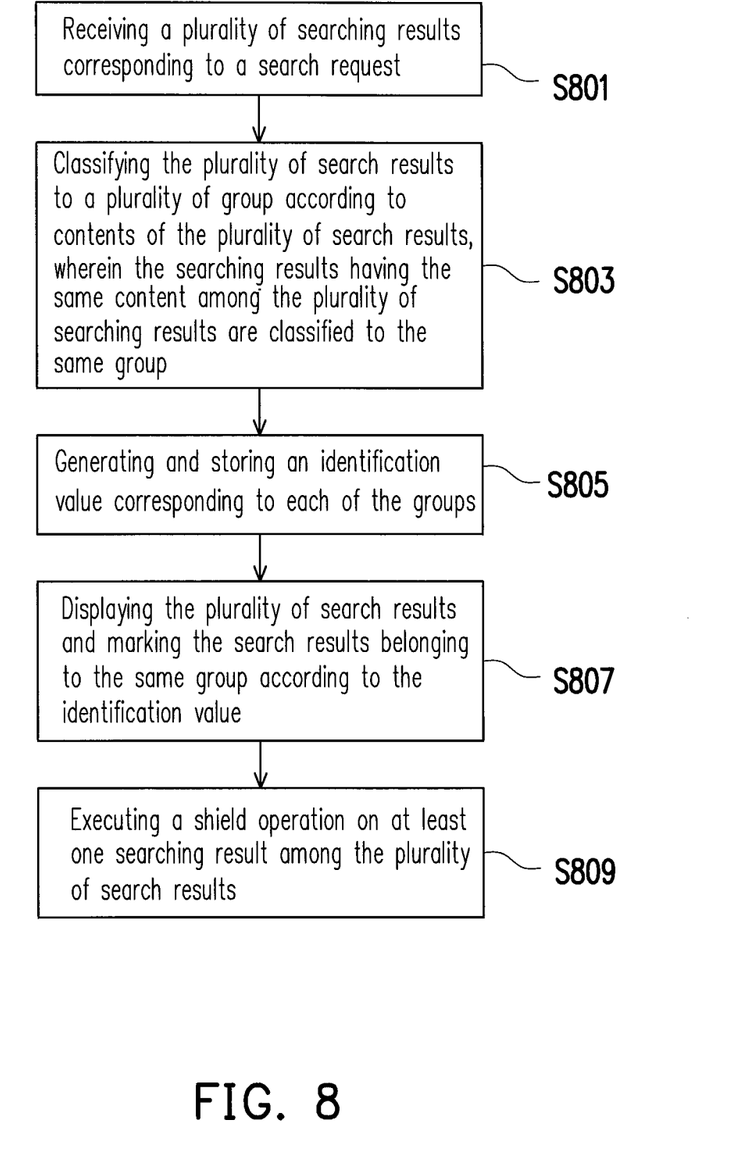
FIG. 8 is a flowchart illustrating a method for masking and filtering web contents according to an exemplary embodiment of the invention.

FIG. 8 is a flowchart illustrating a method for masking and filtering web contents according to an exemplary embodiment of the invention.

With reference to FIG. 8, first, in step S801, the user terminal 104 receives a plurality of searching results corresponding to a search request.

In step S803, the plug-in module 110 classifies the searching results to a plurality of groups according to contents of the searching results, such that the searching results having the same content among the searching results are classified to the same group.

Then, in step S805, the plug-in module 110 generates and stores an identification value corresponding to each of the groups.

In step S807, the web browser displays the searching results and marks the searching results the search results belonging to the same group according to the identification value.

Thereafter, in step S809, the plug-in module 110 executes a shield operation on at least one searching result among the searching results.

Nevertheless, each step illustrated in FIG. 8 has been described in detail above and thus, will not be repeatedly described. Moreover, the method shown in FIG. 8 may be performed together with the aforementioned embodiments or alone, which is not limited in the invention.

Furthermore, the invention is further directed to a computer program product composed of a plurality of program instructions. Specifically, after the program instructions are loaded in the computer system and executed, the steps of method for masking and filtering web contents can be finished, such that the computer system has the functions provided by the system for masking and filtering web contents.

In light of the foregoing, according to the method and the system for masking and filtering web contents and the computer program product thereof provided by the invention, the searching results having duplicate contents can be filtered out of the web page by means of masking and filtering the web page elements and thereby, accuracy of the searching results presented in the web page can be effectively enhanced. Moreover, in the method and the system for masking and filtering web contents and the computer program product thereof provided by the invention, a plug-in module is provided, such that the user can operate and set the graphical interface provided by the plug-in module according to his/her demand to locate the target data more quickly. In this way, the browsing time can be saved, and the accuracy and quality of the searching results can be enhanced.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for filtering a plurality of search results in a web page, the method comprising:
receiving a plurality of searching results corresponding to a search request;

classifying the plurality of search results to a plurality of groups according to contents of the plurality of search results;

generating and storing an identification value corresponding to each of the groups;

displaying the plurality of search results and marking the search results belonging to the same group according to the identification value; and executing a shield operation on at least one searching result among the plurality of search results, comprising:

blocking a selected region for the searching results on a displaying screen of a web browser after a selecting region function is selected;

generating a mask for at least one first searching result among the searching results covered by the selected region according to the selected region, wherein the at least one first searching result is not displayed;

identifying a plurality of second search results among the search results having a similarity value greater than a filtering ratio after a filtering ratio function is selected; and     displaying only one of the second search results without displaying other second search results.

2. The method according to claim 1, wherein the searching results having the same content are classified to the same group.

3. The method according to claim 2, wherein the step of executing the shield operation on the at least one searching result among the plurality of search results comprises:

providing a plurality of functional options in a graphical interface, wherein the functional options includes the selecting region function, a masking region function, the filtering ratio function and a filtering record function;

receiving a confirming masked region message of executing the shield operation on the searching results belonging to a first group among the groups after the masking region function is selected; and     generating a mask for the searching results belonging to the first group and displaying only one of the searching results belonging to the first group.

4. The method according to claim 3, further comprising:

storing at least one display result corresponding to the selecting region function, the masking region function and the filtering ratio function; and     recording the at least one display result as at least one filtering record.

5. The method according to claim 4, wherein the step of executing the shield operation on the at least one searching result among the plurality of search results comprises:

receiving a filtering record selection message corresponding to the at least one filtering record after the filtering record function is selected; and     displaying the plurality of the searching results according to the at least one filtering record corresponding to the filtering record selection message.

6. The method according to claim 1, wherein the step of executing the shield operation on the at least one searching result among the plurality of search results comprises:

receiving the filtering ratio after the filtering ratio function is selected.

7. A system for filtering a plurality of search results in a web page, the system comprising:

a web server; and a user terminal, wherein the user terminal receives a plurality of searching results corresponding to a search request from the web server and has a plug-in module displayed in a form of a graphical interface and executed on a web browser,     wherein the plug-in module classifies the searching results to a plurality of groups according contents of the plurality of searching results,     wherein the plug-in module generates and stores an identification value corresponding to each of the groups,     wherein the web browser displays the plurality of search results and marks the search results belonging to the same group according to the identification value,     wherein the plug-in module executes a shield operation on at least one searching result among the plurality of search results, the plug-in module comprises a selecting region module, the selecting region module blocks a selected region for the searching results on a displaying screen of the web browser after a selecting region function is selected, and generates a mask for at least one first searching result among the searching results covered by the selected region according to the selected region, and the web browser does not display the at least one first searching result; and     wherein the plug-in module further comprises a filtering ratio module, the filtering ratio module identifies a plurality of second search results among the search results having a similarity value greater than a filtering ratio after a filtering ratio function is selected and the web browser displays only one of the second search results without displaying other second search results.

8. The system according to claim 7, wherein the searching results having the same content are classified to the same group.

9. The system according to claim 8, wherein the plug-in module provides a plurality of functional options in a graphical interface, wherein the functional options includes the selecting region function, a masking region function, the filtering ratio function and a filtering record function, and further comprises a masking region module,     wherein the masking region module receives a confirming masked region message of executing the shield operation on the searching results belonging to a first group among the groups after the masking region function is selected, and     wherein the masking region module generates a mask for the searching results belonging to the first group, such that the web browser displays only one of the searching results belonging to the first group.

10. The system according to claim 9, wherein the plug-in module further comprises a database module and a filtering recording module,     wherein the database module stores at least one display result corresponding to the selecting region function, the masking region function and the filtering ratio function,     wherein the filtering recording module records the at least one display result as at least one filtering record.

11. The system according to claim 10, wherein the filtering recording module further receives a filtering record selection message corresponding to the at least one filtering record after the filtering record function is selected,     wherein the filtering recording module induces the web browser to display the searching results according to the at least one filtering record corresponding to the filtering record selection message.

12. The system according to claim 7, wherein the filtering ratio module receives the filtering ratio after the filtering ratio function is selected.

13. A non-transitory computer readable storage medium, storing a plurality of program instructions for loading into an electronic device to perform steps comprising:

receiving a plurality of searching results corresponding to a search request;

classifying the plurality of search results to a plurality of groups according to contents of the plurality of search results;

generating and storing an identification value corresponding to each of the groups;

displaying the plurality of search results and marking the search results belonging to the same group according to the identification value; and executing a shield operation on at least one searching result among the plurality of search results, comprising:

blocking a selected region for the searching results on a displaying screen of a web browser after a selecting region function is selected;

generating a mask for at least one first searching result among the searching results covered by the selected region according to the selected region, wherein the at least one first searching result is not displayed;

identifying a plurality of second search results among the search results having a similarity value greater than a filtering ratio after a filtering ratio function is selected; and displaying only one of the second search results without displaying other second search results.

14. The non-transitory computer readable storage medium according to claim 13, wherein the searching results having the same content are classified to the same group.

15. The non-transitory computer readable storage medium according to claim 14, wherein the step of executing the shield operation on the at least one searching result among the plurality of search results comprises:

providing a plurality of functional options in a graphical interface, wherein the functional options includes the selecting region function, a masking region function, the filtering ratio function and a filtering record function;

receiving a confirming masked region message of executing the shield operation on the searching results belonging to a first group among the groups after the masking region function is selected; and generating a mask for the searching results belonging to the first group and displaying only one of the searching results belonging to the first group.

16. The non-transitory computer readable storage medium according to claim 15, wherein the at least one program instruction is further loaded to the computer system to perform steps comprising:

storing at least one display result corresponding to the selecting region function, the masking region function and the filtering ratio function; and recording the at least one display result as at least one filtering record.

17. The non-transitory computer readable storage medium according to claim 16, wherein the step of executing the shield operation on the at least one searching result among the plurality of search results comprises:

receiving a filtering record selection message corresponding to the at least one filtering record after the filtering record function is selected; and displaying the plurality of the searching results according to the at least one filtering record corresponding to the filtering record selection message.

18. The non-transitory computer readable storage medium according to claim 13, wherein the step of executing the shield operation on the at least one searching result among the plurality of search results comprises:

receiving the filtering ratio after the filtering ratio function is selected.

\* \* \* \* \*